US011921548B2

(12) United States Patent
Rivolta et al.

(10) Patent No.: US 11,921,548 B2
(45) Date of Patent: Mar. 5, 2024

(54) METHOD FOR DETECTING AN OPEN OR CLOSED STATE OF A FOLDABLE ELECTRONIC DEVICE

(71) Applicant: STMICROELECTRONICS S.r.l., Agrate Brianza (IT)

(72) Inventors: Stefano Paolo Rivolta, Desio (IT); Roberto Mura, Milan (IT); Lorenzo Bracco, Chivasso (IT); Federico Rizzardini, Settimo Milanese (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 18/047,187

(22) Filed: Oct. 17, 2022

(65) Prior Publication Data

US 2023/0125175 A1    Apr. 27, 2023

(30) Foreign Application Priority Data

Oct. 25, 2021   (IT) .......................... 102021000027347

(51) Int. Cl.
*G06F 1/16* (2006.01)
(52) U.S. Cl.
CPC .................................. *G06F 1/1677* (2013.01)
(58) Field of Classification Search
CPC .............................. G06F 1/1677; G06F 1/1616
See application file for complete search history.

(56) References Cited

U.S. PATENT DOCUMENTS 8,633,910 B2   1/2014   Miyazawa et al.
9,524,030 B2   12/2016  Modarres et al.
2009/0086879 A1   4/2009   Ogata et al.
2011/0304564 A1   12/2011  Kim et al.
2012/0278638 A1   11/2012  Wang et al.

(Continued)

FOREIGN PATENT DOCUMENTS

EP    2980609 A1    2/2016
KR    20080095447 A    10/2008
KR    20110061750 A    6/2011

OTHER PUBLICATIONS

Wang, "Capacitive Sensing: Ins and Outs of Active Shielding," Texas Instruments, Application Report SNOA926A, Feb. 2015, 13 pages.

*Primary Examiner* — Yaron Cohen
(74) *Attorney, Agent, or Firm* — Seed IP Law Group LLP (57) ABSTRACT

The present disclosure is directed to a detection method of a first or second state of a foldable electronic device including a first and a second hardware element tiltable to each other and accommodating a first and a second electrode which are in contact with each other when the foldable electronic device is in the first state and at a distance from each other otherwise. The detection method includes: acquiring a first and a second charge variation signal indicative of environmental electric/electrostatic charge variations detected by the first and second electrodes; generating a differential signal indicative of a difference between the first and the second charge variation signals; generating, as a function of the differential signal, one or more feature signals; and generating, as a function of the one or more feature signals, a contact signal indicative of the first or second states of the foldable electronic device.

21 Claims, 5 Drawing Sheets

(56) References Cited

U.S. PATENT DOCUMENTS

| | | |
|---|---|---|
| 2012/0315847 A1 | 12/2012 | Li et al. |
| 2014/0232516 A1 | 8/2014 | Stivoric et al. |
| 2015/0378557 A1 | 12/2015 | Jeong et al. |
| 2016/0342781 A1 | 11/2016 | Jeon |
| 2018/0038948 A1 | 2/2018 | Kemppinen |
| 2019/0064950 A1* | 2/2019 | Hsu ................. G06F 1/1616 |
| 2019/0259351 A1 | 8/2019 | Yoon et al. |
| 2020/0033992 A1 | 1/2020 | Kitada |
| 2020/0400426 A1 | 12/2020 | Gallardo |
| 2021/0011520 A1 | 1/2021 | Bhat et al. |
| 2021/0012687 A1 | 1/2021 | Li et al. |

* cited by examiner

METHOD FOR DETECTING AN OPEN OR CLOSED STATE OF A FOLDABLE ELECTRONIC DEVICE

BACKGROUND

Technical Field

The present disclosure relates to a method for detecting a first or a second state (closed or open state) of a foldable electronic device, such as a personal computer (PC). In particular, it relates to a detection method based on the differential acquisition, through charge variation sensors, of charge variation signals indicative of environmental electric and/or electrostatic charge variations induced on said charge variation sensors. Furthermore, it relates to a corresponding computer program product, to a control unit of the foldable electronic device configured to implement the detection method, and to the same foldable electronic device.

Description of the Related Art

As known, the improvement of the user experience allows to make it easier and simpler the use of computers, PCs, portable devices and smart appliances.

In particular, with exemplary reference to the case of a foldable electronic device (hereinafter, e.g., a PC), the improvement of the user experience may comprise the automatic deactivation of the PC when the screen is closed (i.e., the switching of the PC from the use state to the standby state, where for example the screen is off, or hibernate state, where the PC is off) and the switching of the PC to a tablet mode when the PC is fully open.

This therefore involves detecting the state of the PC (closed, open or tablet mode), and in particular determining the corresponding position of the screen with respect to the PC keyboard (e.g., PC open or PC fully closed).

Known solutions exploit one or more Hall sensors to detect the state of the PC. For example, it is known to use a magnet fixed with respect to the keyboard and a Hall sensor fixed with respect to the screen (or vice versa) to determine the state of the PC: measuring, by the Hall sensor, the magnetic field generated by the magnet, the Hall sensor and the magnet relative distance, and therefore the state of the PC, may be determined.

However, the use of Hall sensors complicates the PC structure of the PC and increases its overall cost. Furthermore, the magnetic field generated by the magnet integrated in the PC may cause both interferences with a PC compass and unwanted effects for the user (e.g., it may make the PC magnetic and therefore attract iron-magnetic bodies placed in the vicinity of the PC). The Hall sensor is sensitive to any magnetic field, and therefore also to external magnetic fields possibly present at the PC; as a result, the detection of the state of the PC may be adversely affected by magnetic objects placed in proximity to the PC, which generate such external magnetic fields. Furthermore, the determination of the state of the PC through Hall sensors is based on a measurement of proximity, and not of real contact between keyboard and screen; this generates incorrect detections of state of the PC when the screen is almost closed but is not yet actually in contact with the keyboard (e.g., false PC-closed state detections for small lid angles, e.g., less than about 5°).

BRIEF SUMMARY

Various embodiments of the present disclosure provide a method for detecting a first or a second state (closed or open state) of a foldable electronic device, which overcomes the drawbacks of the prior art.

The foldable electronic device includes a first and a second hardware element tiltable to each other and accommodating a first and a second electrode which are in contact with each other when the foldable electronic device is in the first state and at a distance from each other otherwise. The detection method includes: acquiring a first and a second charge variation signal indicative of environmental electric/electrostatic charge variations detected by the first and second electrodes; generating a differential signal indicative of a difference between the first and the second charge variation signals; generating, as a function of the differential signal, one or more feature signals; and generating, as a function of the one or more feature signals, a contact signal indicative of the first or second states of the foldable electronic device.

BRIEF DESCRIPTION OF THE SEVERAL VIEWS OF THE DRAWINGS

For a better understanding of the present disclosure, various embodiments are now described, purely by way of non-limiting example, with reference to the attached drawings, wherein.

Elements common to the different embodiments are indicated hereinafter with the same reference numerals.

DETAILED DESCRIPTION

Figure 1:
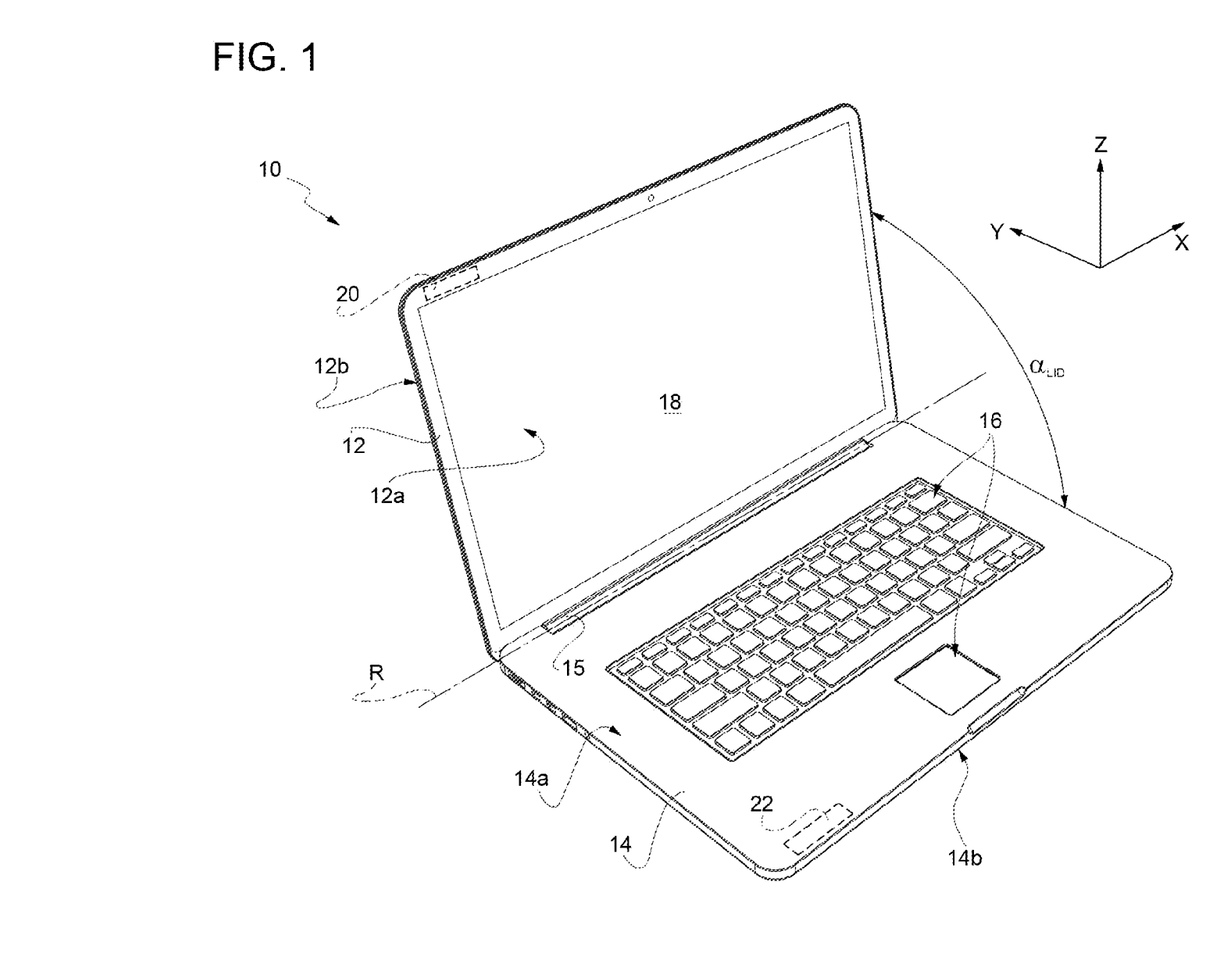
FIG. 1 is a perspective view of a foldable electronic device comprising a first and a second charge variation sensor, according to an embodiment.

FIG. 1 shows, in a triaxial Cartesian reference system defined by axes X, Y and Z, a foldable electronic device 10. For purely exemplary purpose, the foldable electronic device 10 is hereinafter considered to be a PC, although it is apparent that other foldable electronic devices may similarly be considered (e.g., a foldable smartphone, a foldable tablet, etc.).

The PC 10 is exemplarily shown in FIG. 1 in an open-device operating condition.

The PC 10 includes a lid portion 12 and a base portion 14, mechanically coupled to each other by a hinge 15 which allows the lid portion 12 to rotate with respect to the base portion 14, forming a rotation constraint around a rotation axis R (or axis R), in FIG. 1 exemplarily shown parallel to the axis X. The base portion 14 comprises at least one interface device 16 (e.g., keyboard and/or trackpad) extending at a first surface 14a of the base portion 14. The lid portion 12 comprises a screen 18 extending at a first surface 12a of the lid portion 12. In a closed-device operating condition (either closed state or first state of the PC 10), the first surfaces 12a, 14a face each other and are substantially parallel to each other, while in the open-device operating condition (either open state or second state of the PC 10) are arranged transversely to each other. Furthermore, the lid portion 12 has a second surface 12b opposite to the first surface 12a with respect to the lid portion 12, and the base portion 14 has a respective second surface 14b opposite to the first surface 14a with respect to the base portion 14; the second surfaces 12b and 14b of the lid portion 12 and of the base portion 14 face each other when the PC 10 is in the tablet mode.

The lid portion 12 further comprises a first electric and/or electrostatic charge variation sensor (hereinafter referred to as the first charge variation sensor, or more simply the first sensor) 20 facing the first surface 12a of the lid portion 12, and the base portion 14 further comprises a second electric and/or electrostatic charge variation sensor (hereinafter referred to as the second charge variation sensor, or more simply the second sensor) 22 facing the first surface 14a of the base portion 14. The first and second charge variation sensors 20 and 22 form a sensor module 25 (FIG. 2) of the PC 10.

The first and second charge variation sensors 20 and 22 are arranged in such a way that they are in physical and electrical contact with each other when the PC 10 is in the first state (closed state), and are at a distance from each other when the PC 10 is in the second state (open state). In other words, considering an opening angle $\alpha_{LID}$ formed between the first surface 12a of the lid portion 12 and the first surface 14a of the base portion 14 (also known as the "lid angle"), the charge variation sensors 20 and 22 are in mutual contact when the lid angle $\alpha_{LID}$ is equal to 0° (the PC 10 is closed) and they are not when the lid angle $\alpha_{LID}$ is different from or greater than 0° (the PC 10 is open).

Figure 2:
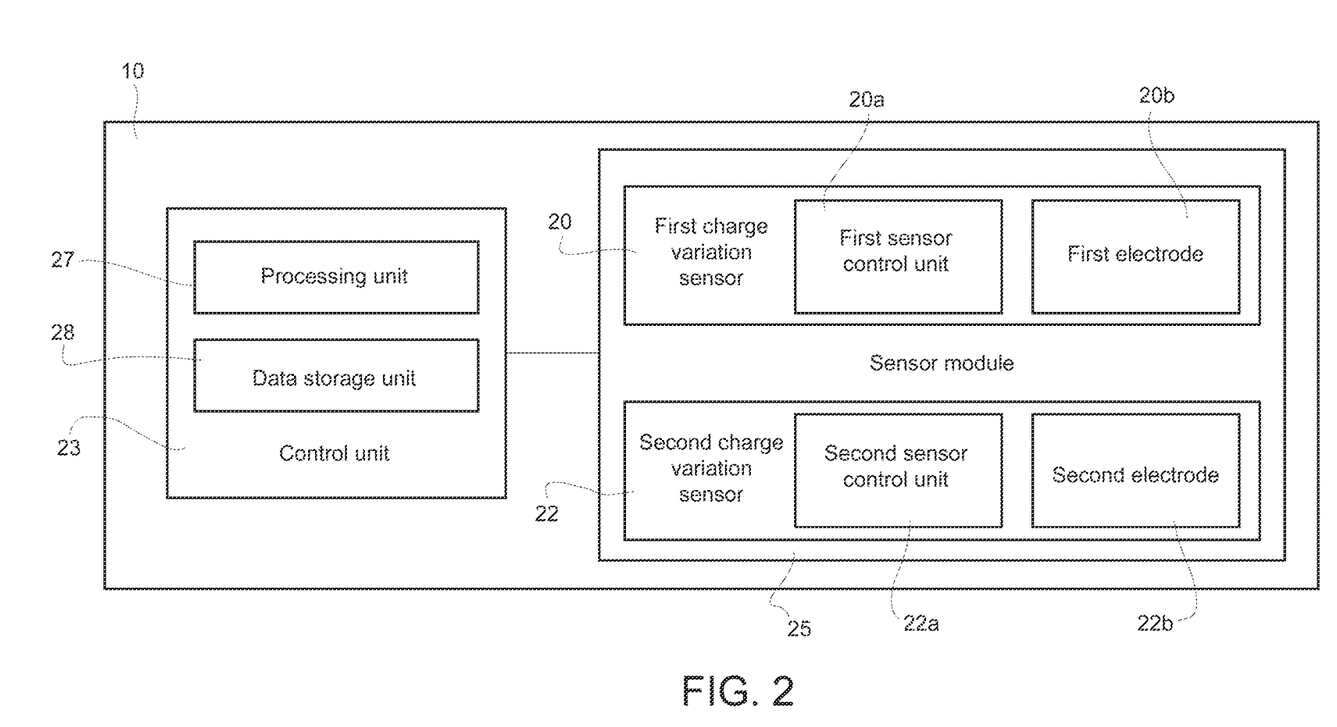
FIG. 2 is a block diagram of the foldable electronic device of FIG. 1, according to an embodiment.

In particular, as better shown in FIG. 2, each of the first and second charge variation sensors 20 and 22 comprises a sensor control unit (e.g., control circuitry) (respectively referred to as the first sensor control unit 20a and the second sensor control unit 22a) and one or more electrodes (respectively referred to as the first electrode 20b and the second electrode 22b), electrically coupled to each other. In particular, the electrodes 20b and 22b are in mutual physical and electrical contact when the PC 10 is closed, and they are not in mutual contact when the PC 10 is open. For example, furthermore, each sensor control unit 20a, 22a is integrated in the respective charge variation sensor 20, 22.

In use, each electrode 20b, 22b detects an environmental electric and/or electrostatic charge variation (induced by the environment surrounding the PC 10 on the same charge variation sensor 20, 22) and generates a respective detection signal $S_R$ (e.g., analog signal) indicative of said environmental electric and/or electrostatic charge variation. The detection signal $S_R$ is acquired by the sensor control unit 20a, 22a which generates, as a function of the detection signal $S_R$, a respective charge variation signal $S_Q$ (e.g., digital signal) also indicative of said environmental electric and/or electrostatic charge variation.

For example, the sensor control unit 20a, 22a comprises an interface circuit coupled to the electrode 20b, 22b. In particular, the interface circuit is configured to pre-process the charge variation signal $S_Q$. For example, the interface circuit comprises an amplification circuit and/or an analog-to-digital converter (ADC) and/or serial communication modules (e.g., UART, SPI, I2C, etc.), not shown, in order to amplify and/or digitally convert the detection signal $S_R$.

In greater detail, the electrode 20b, 22b of the charge variation sensor 20, 22 may have a conductive or metal surface or be made of a conductive or metal material coated with dielectric material, or even have a conductive or metal surface arranged under a case of the PC 10. In any case, during use, the electrode 20b, 22b is electrically/electrostatically coupled to the environment where the PC 10 is present, in order to detect the environmental electric/electrostatic charge variations induced by factors external to the PC 10 (e.g., alternating current at 50 Hz or 60 Hz, objects, movements of animated bodies such as animals or people).

According to an embodiment, the electrode 20b, 22b is integrated into the case of the PC 10, and for example comprises a conductive track formed on, or in, a wafer of semiconductor material comprised in the PC 10. According to a different embodiment, the electrode 20b, 22b is a metal element present in the PC 10, such as a portion of the same outer case or of a frame of the PC 10. Optionally, when a possible use of the foldable electronic device 10 in a humid environment (more specifically in water) is envisaged, the electrode 20b, 22b is inserted inside a waterproof case, or in any case is shielded by one or more protective layers, so as to prevent direct contact of the electrode 20b, 22b with water or humidity: in this case, the waterproof case or the one or more protective layers are made of a material (e.g., dielectric or insulating material, such as plastics) such that it doesn't shield the environmental electric/electrostatic charge generated by the external environment, which should be acquired by the electrode 20b, 22b. Other embodiments are possible, as apparent to the person skilled in the art, so that the electrode 20b, 22b is electrically/electrostatically coupled with the environment during use.

Figure 5A:
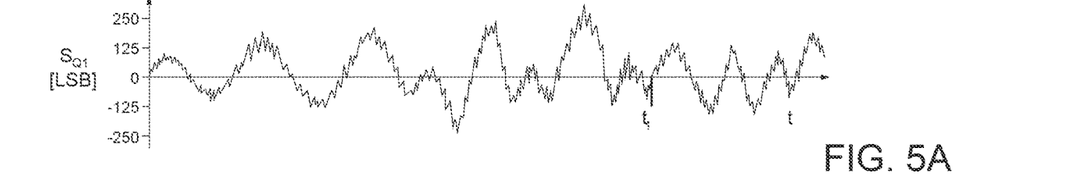
FIGS. 5A-5G are graphs of electrical signals generated by implementing the detection method of FIG. 4.
Figure 5B:
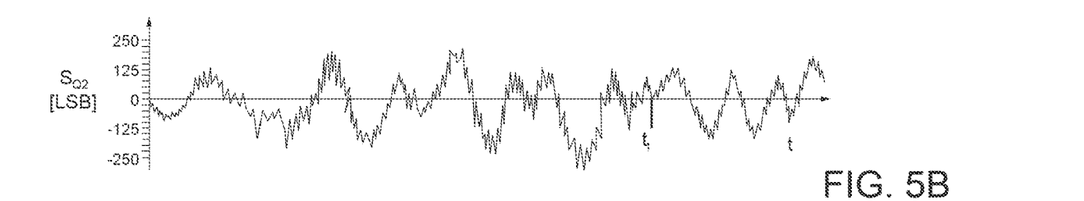

Furthermore, as better shown in FIG. 2, the PC 10 comprises a control unit 23 (e.g., control circuitry) which is operatively coupled to the first and second charge variation sensors 20, 22 and is configured to receive and process the charge variation signals $S_Q$ coming from the first and second charge variation sensors 20 and 22 (hereinafter also referred to as, respectively, the first charge variation signal and the second charge variation signal, and indicated in FIGS. 5A and 5B with the references $S_{Q1}$ and $S_{Q2}$, respectively). For example, the control unit 23 comprises a processing unit 27 (e.g., processing circuitry) (such as a central processing unit (CPU), a microprocessor, an application processor (AP) or a dedicated calculation unit) for processing the charge variation signals $S_Q$, and a data storage unit 28 (e.g., storage circuitry) (such as a memory, e.g., a non-volatile memory) for storing data, coupled to each other.

In particular, in use the control unit 23 receives the charge variation signals $S_Q$ coming from the first and second charge variation sensors 20 and 22 and generates a differential signal $S_D$ which is indicative of a relative difference between the charge variation signals $S_Q$ of the charge variation sensors 20. In detail, the differential signal $S_D$ is calculated as a function of (e.g., is equal to or proportional to) the difference between the charge variation signal $S_Q$ of the first charge variation sensor 20 and the charge variation signal $S_Q$ of the second charge variation sensor 22.

FIGS. 3A-3D show, as a function of time, the differential signal $S_D$ in different operating conditions of the charge variation sensors 20 and 22.

Figure 3A:
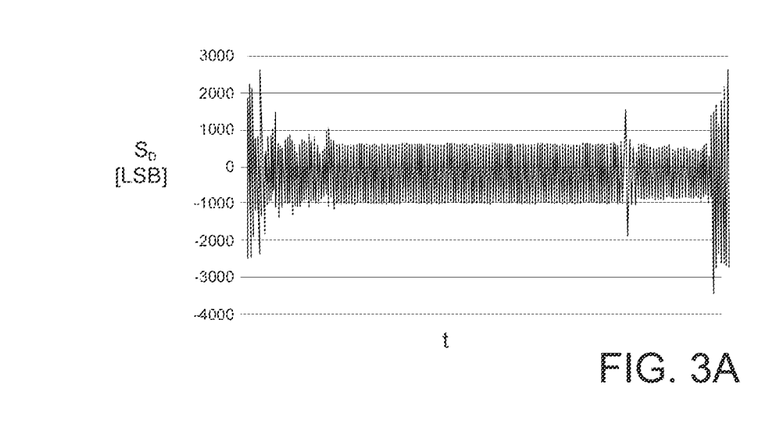
FIGS. 3A-3D are graphs of an electrical signal generated as a function of the measurements of the first and second charge variation sensors, in respective operating modes of the charge variation sensors.

In detail, FIG. 3A shows the differential signal $S_D$ in case the charge variation sensors 20 and 22 are not in direct electrical contact with each other (i.e., the PC 10 is open) and an alternating current is present in the environment surrounding the PC 10. In other words, a power supply (e.g., provided through an electrical plug) is present in the proximity of the PC 10 and provides an alternating electric current (e.g., at 50 or 60 Hz) to power electrical apparatuses (e.g., lamps, appliances or the same PC 10). This alternating electric current generates an environmental electric and/or electrostatic charge variation at the PC 10, which is detected by the charge variation sensors 20 and 22. Since the charge variation sensors 20 and 22 are at a distance from each other, they do not detect environmental electric/electrostatic charge variations equal to each other (e.g., due to distances different from each other from electric/electrostatic charge sources, such as the power supply, and therefore to phase-shifts different from each other) and therefore the differential signal $S_D$ has a strongly oscillatory trend. For example, the peaks (similarly, the valleys) of the differential signal $S_D$ have an average amplitude that is greater than a first threshold amplitude (e.g., equal to about 600 LSB).

Figure 3B:
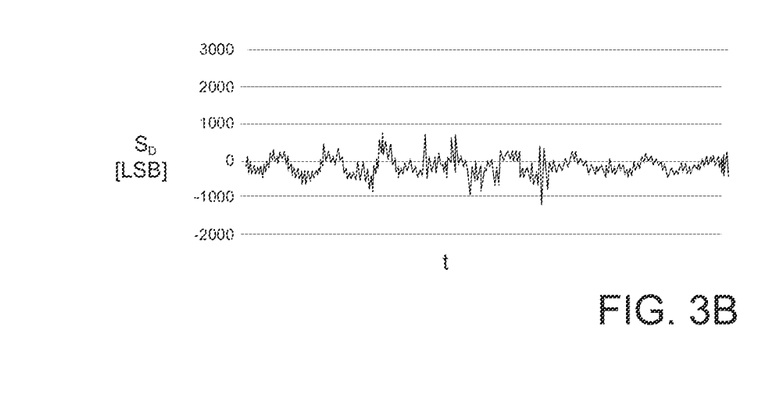

FIG. 3B shows the differential signal $S_D$ in case the charge variation sensors 20 and 22 are not in contact with each other (i.e., the PC 10 is open) and no alternating electric current is present in the environment surrounding the PC 10. The differential signal $S_D$ has an oscillatory trend due to the environmental electric/electrostatic charge variations which are different from each other for the charge variation sensors 20 and 22; however, given the absence of alternating electric current in the external environment, the oscillation of the differential signal $S_D$ of FIG. 3B is less than that of FIG. 3A. For example, the peaks (similarly, the valleys) of the differential signal $S_D$ have an average amplitude comprised between the first threshold amplitude and a second threshold amplitude smaller than the first threshold amplitude (e.g., equal to about 100 LSB).

Figure 3C:
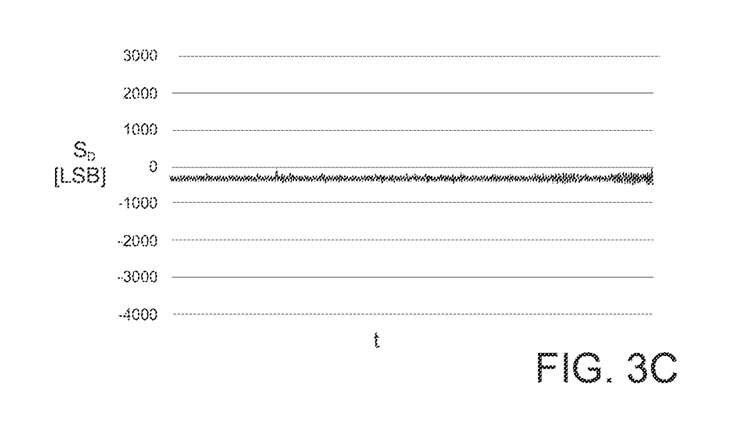

FIG. 3C shows the differential signal $S_D$ in case the charge variation sensors 20 and 22 are in direct electrical contact (e.g., in physical contact) with each other (i.e., the PC 10 is closed) and the alternating electric current is present in the environment surrounding the PC 10. Since the electrodes 20b and 22b of the charge variation sensors 20 and 22 are short-circuited with each other, the detected environmental electric/electrostatic charge variations are substantially equal to each other and therefore the differential signal $S_D$ is about zero. Any oscillations, having reduced amplitude, are mainly due to measurement noises. For example, the peaks (similarly, the valleys) of the differential signal $S_D$ have an average amplitude that is smaller than the second threshold amplitude and the differential signal $S_D$ has an average value that is about zero (e.g., less than about 10 LSB).

Figure 3D:
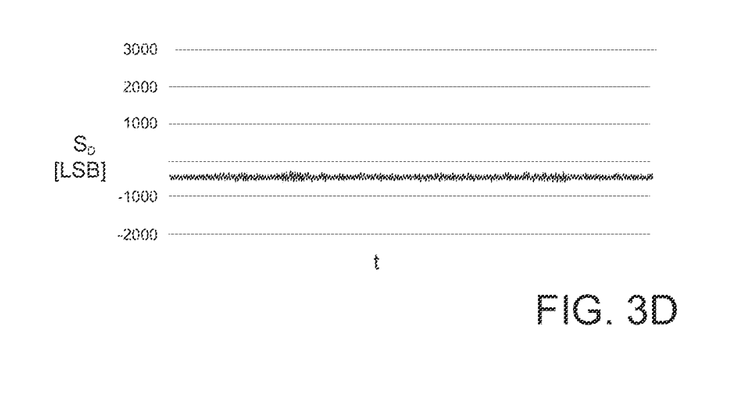

FIG. 3D shows the differential signal $S_D$ in case the charge variation sensors 20 and 22 are in direct electrical contact with each other (i.e., the PC 10 is closed) and no alternating current is present in the environment surrounding the PC 10. The trend of the differential signal $S_D$ is similar to that of FIG. 3C, since the electrodes 20b and 22b of the charge variation sensors 20 and 22 are short-circuited with each other. The differential signal $S_D$ is therefore about zero and the relative trend is not described in detail again.

Figure 4:
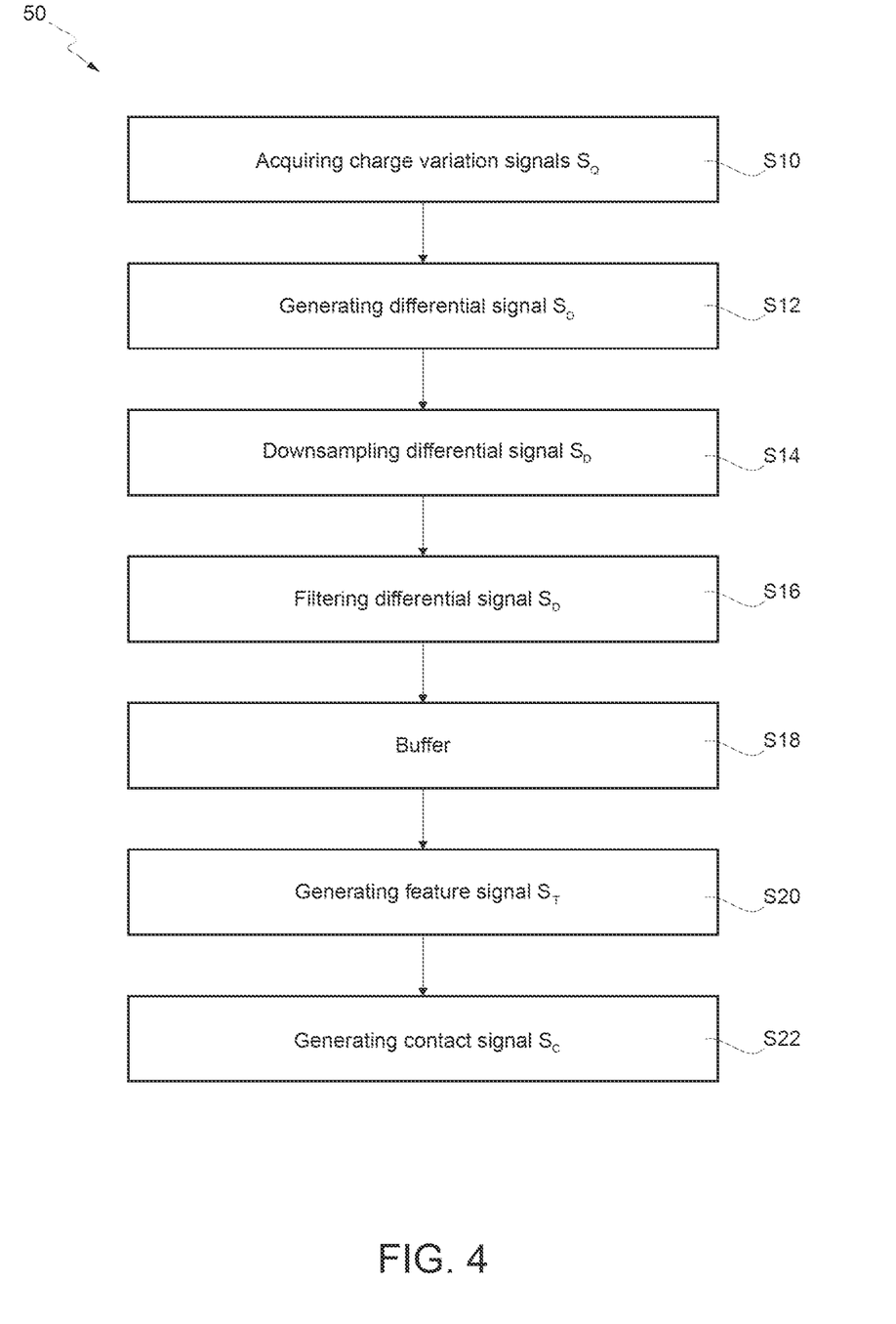
FIG. 4 is a block diagram illustrating a method for detecting a state of the foldable electronic device of FIG. 1, according to an embodiment.

FIG. 4 shows a detection method 50 of the state of the PC 10, performed by the control unit 23 in order to detect whether the PC 10 is in the first state (closed state) or in the second state (open state).

At a step S10 of the detection method 50, the charge variation signals $S_Q$ are acquired through the first and second charge variation sensors 20 and 22, for example with acquisition frequency equal to about 240 Hz. FIG. 5A shows an example of the first charge variation signal $S_{Q1}$ acquired through the first charge variation sensor 20, and FIG. 5B shows an example of the second charge variation signal $S_{Q2}$ acquired through the second charge variation sensor 22. As it may be noted, the charge variation signals $S_{Q1}$ and $S_{Q2}$ are different from each other in a first time interval ($t<t_1$) and are substantially equal to each other in a second time interval ($t \geq t_1$) subsequent to the first time interval.

Figure 5C:
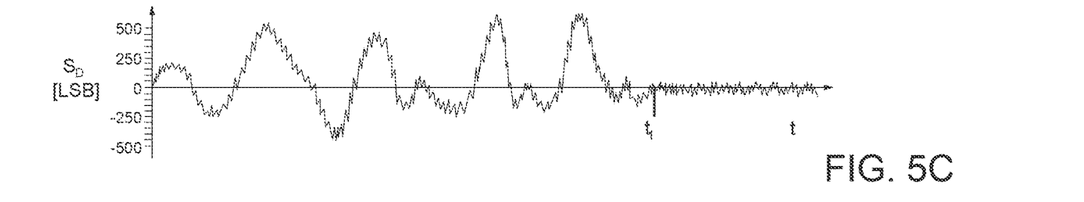

At a step S12 immediately following step S10, the differential signal $S_D$ is generated as a function of the charge variation signals $S_Q$, as previously described. An example of the differential signal $S_D$ is shown in FIG. 5C and it may be noted how, in the example considered, it oscillates in the first time interval while it is substantially zero in the second time interval.

Figure 5D:
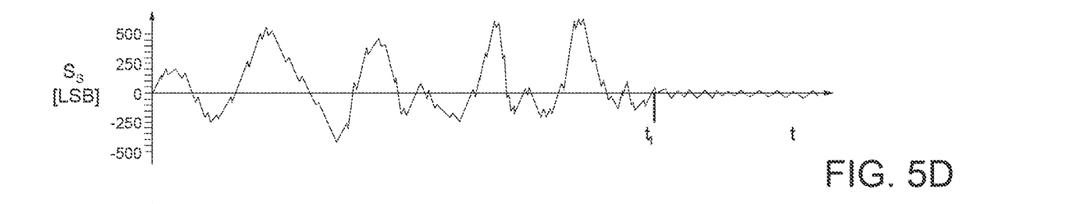

At a step S14 (optional) immediately following step S12, the differential signal $S_D$ is downsampled at a sampling frequency lower than the acquisition frequency in step S10 and, for example, equal to about 60 Hz. In other words, at step S14 a downsampled signal $S_S$ is generated by decimating the differential signal $S_D$. An example of the downsampled signal $S_S$ is shown in FIG. 5D. It is noted that step S14 is optional and may be removed from the method 50.

Figure 5E:
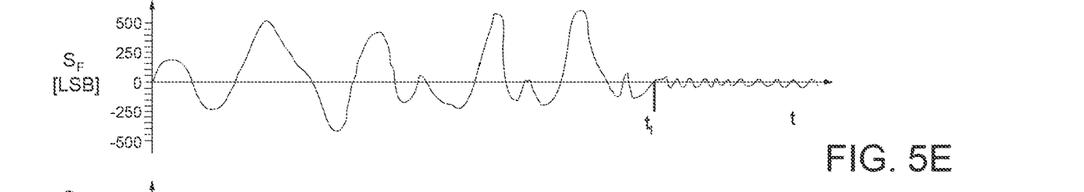

At a step S16 (optional) immediately following step S14, the differential signal $S_D$ is filtered at high frequencies, so as to remove the offset of the differential signal $S_D$. In particular, at step S16 a filtered signal $S_F$ is generated by filtering the downsampled signal $S_S$. In greater detail, the filtering is of high-pass type and has a cut-off frequency greater than a threshold cut-off frequency, for example comprised between 1 Hz and 20 Hz and for example equal to 5 Hz. Alternatively, the filtering is of band-pass type, for example with a lower cut-off frequency greater than the threshold cut-off frequency and with a higher cut-off frequency comprised between 15 Hz and 40 Hz (e.g., equal to 20 Hz). An example of the filtered signal $S_F$ is shown in FIG. 5E. It is noted that step S16 is optional and may be removed from the method 50.

Figure 5F:
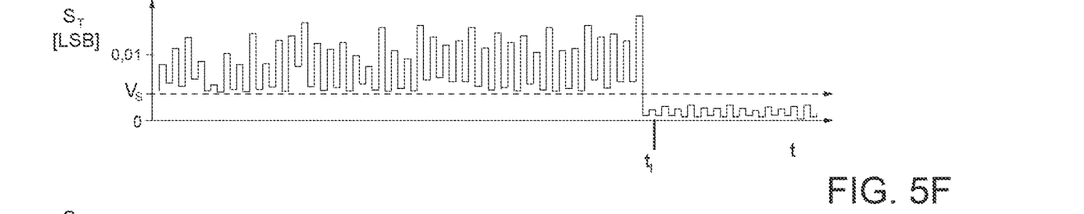

Subsequently (steps S18 and S20), one or more feature signals $S_T$ are generated that are indicative of respective features of the differential signal $S_D$ (in greater detail, of the filtered signal $S_F$). These features are quantities of interest of the filtered signal $S_F$, such as statistical quantities of the filtered signal $S_F$ (e.g., peak-to-peak amplitude, variance, number of peaks with greater amplitude than a threshold, standard deviation, energy, etc.). According to an embodiment exemplarily considered hereinafter, one feature signal $S_T$ is considered that is indicative of the variance of the filtered signal $S_F$; however, a greater number of feature signals $S_T$ may be considered and different and further quantities of interest of the filtered signal $S_F$ may be similarly considered, in addition to or in place of the variance (in detail, when energy is considered it is preferable to implement the previously described filtering at step S16, to remove the DC contribution of the differential signal $S_D$). An example of the feature signal $S_T$ is shown in FIG. 5F.

More in detail, at a step S18 immediately following step S16, the differential signal $S_D$ (in detail, the filtered signal $S_F$) is stored in a buffer for a buffering period. In other words, at step S18 a respective portion, or time window, of the filtered signal $S_F$, which has a duration equal to the buffering period, is stored in the buffer. For example, the buffering period is equal to about 1 sec (e.g., it allows 60 samples of the filtered signal $S_F$ downsampled at 60 Hz to be stored, as previously discussed).

Furthermore, at a step S20 immediately following step S18, the feature signal $S_T$ is generated indicative of the variance of the filtered signal $S_F$. In particular, at step S20 the variance of each time window of the filtered signal $S_F$ is calculated, and the feature signal $S_T$ is generated as a concatenation of the variance values of the time windows subsequent to each other. In other words, the feature signal $S_T$ is formed by joining, in succession to each other, the variance values calculated for the time windows of the filtered signal $S_F$ and therefore has, in each buffering period, a constant value equal to the variance associated with the respective time window. In the example of FIG. 5F, it is noted how the variance of the filtered signal $S_F$ is greater than a threshold variance $V_S$ (better described hereinafter) in the first time interval, and is smaller than the threshold variance $V_S$ in the second time interval.

Figure 5G:
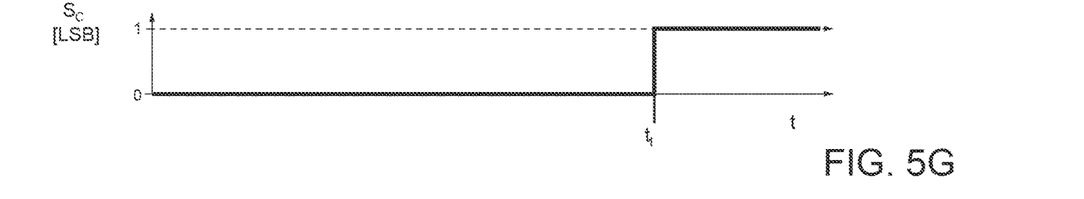

At a step S22 immediately following step S20, a contact signal $S_C$ is generated, as a function of the feature signal $S_T$, indicative of the presence or absence of contact between the electrodes 20b and 22b of the charge variation sensors 20 and 22. In particular, the contact signal $S_C$ assumes, at each time instant considered, a first value (e.g., 0) when no contact is detected between the charge variation sensors 20 and 22 (second state of the PC 10), or a second value (e.g., 1) when a physical and electrical contact is detected between the charge variation sensors 20 and 22 (first state of the PC 10). An example of the contact signal $S_C$ is shown in FIG. 5G where it is seen that the contact signal $S_C$ assumes the first value in the first time interval and assumes the second value in the second time interval. In other words, at the instant $t_1$ the PC 10 is closed.

As discussed above, the detection method 50 of the state of the PC 10 may be performed by the control unit 23. For example, the control unit 23 includes an acquirer configured to perform step S10, a differential signal generator configured to perform step S12, a downsampler configured to perform step S14, a filter configured to perform step S16, a buffer configured to perform step S18, a feature signal generator configured to perform S20, and a contact signal generator configured to perform S22. These various components may be implemented with a non-transitory computer program product loadable into the control unit 23. The computer program product includes instructions, when executed by the control unit 23, cause the control unit 23 to implement the detection method 50.

According to an embodiment, the contact signal $S_C$ is generated by comparing the feature signal $S_T$ with a feature threshold value (in the exemplarily considered embodiment, the threshold variance $V_S$) and verifying whether the feature signal $S_T$ meets a predefined condition with a feature threshold value: when the value of the feature signal $S_T$ at the considered instant is greater than the threshold variance $V_S$, the corresponding value of the contact signal $S_C$ assumes the first value; and when the value of the feature signal $S_T$ at the considered instant is less than, or equal to, the threshold variance $V_S$, the corresponding value of the contact signal $S_C$ assumes the second value. In detail, the feature threshold value is chosen in the design step as a function of the considered feature and of parameters such as the geometric structure and the material of the electrodes 20b and 22b of the charge variation sensors 20 and 22, the detection sensitivity desired by the user, etc.; as a result, the feature threshold value is generally obtained in an experimental manner (e.g., through machine learning techniques) or is set by the same user. For purely exemplary and non-limiting purpose, the threshold variance $V_S$ may be comprised between about 0.003 and about 0.005, and for example may be equal to about 0.0043.

According to a different embodiment, the contact signal $S_C$ is generated by processing the feature signal $S_T$ through machine learning techniques, and in detail through a classifier such as a support vector machine (SVM), a decision tree (DT) or a neural network (NN). In detail, the classifier is trained to generate the corresponding contact signal $S_C$ once the feature signal $S_T$ has been received at input. The training of the classifier is of a per se known type and depends, in a known manner, on the specific classifier chosen and on the design parameters of the PC 10. The training of the classifier is, for example, of supervised type and may comprise the use of an optimization algorithm of known type. In detail, the classifier is trained on the basis of a training dataset which comprises multiple training feature signals having respective labels associated therewith, indicative of the presence or absence of contact between the charge variation sensors 20 and 22. The classifier is trained on the basis of training feature signals which are similar to the feature signals $S_T$. During use, the classifier receives the feature signals $S_T$ as inputs and processes them on the basis of the classification model obtained during the training step to generate the corresponding contact signal $S_C$.

Optionally, the detection method 50 further comprises a step (not shown) for controlling one or more functionalities of the PC 10 as a function of the contact signal $S_C$. In particular, one or more functionalities of the PC 10 are activated or deactivated as a function of the value, at each instant, of the contact signal $S_C$. An example of this functionality is the switching of the PC 10 from a standby state to a use (or work) state when the contact signal $S_C$ switches from the second value to the first value, and vice versa when the contact signal $S_C$ switches from the first value to the second value, and in greater detail at least one of the following functionalities: when the contact signal $S_C$ assumes the first value, the switching on of the screen 18, the automatic and zero-touch access to documents saved in the PC 10, the quick start of the PC 10, the activation of the biometric recognition, the activation of the screen saver, the disabling of functions for energy saving and battery consumption; and when the contact signal $S_C$ assumes the second value, the switching off of the screen 18, the quick shut down of the PC 10, the deactivation of the biometric recognition, the deactivation of the screen saver, the enabling of functions for energy saving and battery consumption.

The detection method 50 may be implemented for example to detect when the PC 10 is in an in-bag mode (i.e., it is in closed state and is carried in a closed container such as a bag or backpack). In fact, in this mode, for example, the PC 10 is set to be in standby state, and in detail the battery consumption to be minimized. In particular, the in-bag mode of the PC 10 is detected when the contact signal $S_C$ assumes the second value (the PC 10 is closed) and an in-bag detection module of known type detects that the PC 10 is carried in a closed space (e.g., this detection is based on recognition of the in-bag mode by machine learning from data obtained from sensors of the PC 10, such as the charge variation sensors 20 and 22).

Furthermore, the detection method 50 may be implemented for example to detect the lid angle $\alpha_{LID}$, even in case the lid angle $\alpha_{LID}$ is equal to 0° (the PC 10 is closed) or to 360° (e.g., tablet mode of the PC 10) during the switch-on step of the PC 10.

From an examination of the characteristics of the various embodiments of the present disclosure, the advantages that it affords are evident.

The detection method 50 allows the state of the PC 10 to be detected without the use of Hall sensors and magnets, thus avoiding the previously discussed disadvantages and reducing the overall cost and design complexity of the PC 10.

Furthermore, the use of the charge variation sensors 20 and 22 allows a real contact to be detected between the first surfaces 12a and 14a of the lid portion 12 and of the base portion 14. This prevents false detections of closed state of the PC 10 which occur instead using known solutions and which are due to the proximity (and not to a real mutual contact) of the first surfaces 12a and 14a and to the magnetic detection.

Finally, it is clear that modifications and variations may be made to the various embodiments described and illustrated herein without thereby departing from the scope of the present disclosure.

For example, the different embodiments described may be combined to provide further solutions.

The first and second electrodes 20b and 22b may both be comprised in a single charge variation sensor (e.g., the first charge variation sensor 20). In other words, one charge variation sensor with two electrodes may be present.

Furthermore, the electrodes 20b and 22b may be directly connected to the control unit 23 (therefore there are no charge variation sensors in the PC 10, and the electrodes are coupled to the control unit 23). In this case, therefore, the control unit 23 is configured both to implement the previously described detection method 50 and to perform the functionalities described with reference to the sensor control units 20a and 22a.

Each charge variation sensor 20, 22 may also comprise a plurality of electrodes, for example electrically arranged in series with each other in order to maximize the detection accuracy of the electric and/or electrostatic charge variations.

Furthermore, the electrodes 20b and 22b of the charge variation sensors 20 and 22 may be arranged on the hinge 15 so as to be in contact with each other when the lid angle $\alpha_{LID}$ is equal to 0° and to be spaced from each other when the lid angle $\alpha_{LID}$ is different from 0°.

Optionally, the PC 10 may further comprise a third and a fourth electrode comprised in a third and, respectively, a fourth charge variation sensor (or more simply a third and fourth sensor, not shown and similar to the first and second charge variation sensors 20 and 22, and therefore not described again in detail) comprised in the lid portion 12 and, respectively, in the base portion 14 so as to face the respective second surfaces 12b and 14b and to be in mutual contact when the lid angle $\alpha_{LID}$ is equal to 360° (tablet mode of the PC 10). For example, the third and fourth electrodes may be arranged on the hinge 15 similarly to what has been previously described. In this manner the closed state of the PC 10 ($\alpha_{LID}$=0°) may be detected through the first and second charge variation sensors 20 and 22 (or more simply through the first and second electrodes), and the tablet mode of the PC 10 ($\alpha_{LID}$=360°) may be detected through the third and fourth charge variation sensors (or more simply through the third and fourth electrodes), similarly to what has been previously discussed.

Furthermore, as previously mentioned, the foldable electronic device 10 may be a device other than a PC. In this case, the lid portion 12 and the base portion 14 are a first and, respectively, a second hardware element tiltable (in particular rotatable) to each other and comprising the first and, respectively, the second charge variation sensors 20 and 22 (or vice versa).

Furthermore, it is apparent that the values of the previously indicated angles (e.g., $\alpha_{LID}$ equal to 0° or to 360°) are to be interpreted with a certain tolerance margin due to design desires or inaccuracies of the PC 10 and for example equal to about ±5°. As a result, the PC 10 may also be considered in the closed state when the lid angle $\alpha_{LID}$ is for example equal to about 3°.

A detection method (50) of a state of a foldable electronic device (10) may be summarized as including a first hardware element (12; 14) and a second hardware element (14; 12) tiltable to each other in a first state or in a second state of the foldable electronic device (10), wherein the first hardware element (12; 14) accommodates a first electrode (20b; 22b) and the second hardware element (14; 12) accommodates a second electrode (22b; 20b), the first and second electrodes (20b, 22b) being in contact with each other when the foldable electronic device (10) is in the first state, being at a distance from each other when the foldable electronic device (10) is in the second state and being configured to detect respective environmental electric and/or electrostatic charge variations, the foldable electronic device (10) further including a control unit (23) coupled to the first and second electrodes (20b, 22b), the detection method (50) including the steps of acquiring (S10), by the control unit (23), a first charge variation signal ($S_{Q1}$) through the first electrode (20b; 22b) and a second charge variation signal ($S_{Q2}$) through the second electrode (22b; 20b), the first ($S_{Q1}$) and the second ($S_{Q2}$) charge variation signals being indicative of said respective environmental electric and/or electrostatic charge variations; generating (S12), by the control unit (23), a differential signal ($S_D$) indicative of a difference between the first ($S_{Q1}$) and the second ($S_{Q2}$) charge variation signals; generating (S14, S16, S18, S20), by the control unit (23) and as a function of the differential signal ($S_D$), one or more feature signals ($S_T$) indicative of respective features of the differential signal ($S_D$); and generating (S22), by the control unit (23) and as a function of the one or more feature signals ($S_T$), a contact signal ($S_C$) which assumes a value equal to a first value (0) or to a second value (1), the first value (0) of the contact signal ($S_C$) being indicative of the absence of contact between the first and second electrodes (20b, 22b) and therefore of the second state of the foldable electronic device (10), and the second value (1) of the contact signal ($S_C$) being indicative of the contact between the first and second electrodes (20b, 22b) and therefore of the first state of the foldable electronic device (10).

The detection method (50) may further include the step of controlling, by the control unit (23), one or more functionalities of the foldable electronic device (10) as a function of the contact signal ($S_C$).

The step of generating (S14, S16, S18, S20) the one or more feature signals ($S_T$) may include downsampling (S14) the differential signal ($S_D$) at a lower sampling frequency than an acquisition frequency of the differential signal ($S_D$).

The step of generating (S14, S16, S18, S20) the one or more feature signals ($S_T$) may include filtering (S16) the differential signal ($S_D$) by a high-pass filter with a cut-off frequency greater than a threshold cut-off frequency, or by a band-pass filter with a lower cut-off frequency greater than the threshold cut-off frequency.

The step of generating (S14, S16, S18, S20) the one or more feature signals ($S_T$) may include a. storing (S18) through a buffer a time window of the differential signal ($S_D$), having a duration equal to a buffering period; and b. calculating (S20) said one or more features of the differential signal ($S_D$) on the basis of said time window.

The step of generating (S14, S16, S18, S20) the one or more feature signals ($S_T$) may include repeating steps a. and b. a plurality of times for a respective plurality of time windows of the differential signal ($S_D$); and forming each of the one or more feature signals ($S_T$) by concatenating the calculated values of the respective feature to each other, each feature signal ($S_T$) assuming each value of the respective feature for a respective duration equal to the buffering period.

The step of generating (S14, S16, S18, S20) the one or more feature signals ($S_T$) may include calculating at least one of the following statistical quantities of the differential signal ($S_D$): peak-to-peak amplitude; variance; number of peaks with amplitude greater than a threshold amplitude; standard deviation; energy.

The step of generating (S22) the contact signal ($S_C$) may include processing the one or more feature signals ($S_T$) through machine learning techniques.

The step of generating (S22) the contact signal ($S_C$) may include comparing the one or more feature signals ($S_T$) with one or more respective feature threshold values ($V_S$), and determining the contact signal ($S_C$) as a function of said comparison of the one or more feature signals ($S_T$) with the one or more feature threshold values ($V_S$).

The step of generating (S14, S16, S18, S20) the one or more feature signals ($S_T$) may include calculating the variance of the differential signal ($S_D$), wherein the step of comparing the one or more feature signals ($S_T$) with the one or more respective feature threshold values ($V_S$) may include comparing each value of the feature signal ($S_T$) indicative of said variance with a threshold variance ($V_s$), and wherein the step of determining the contact signal ($S_C$) as a function of said comparison may include setting the value at each instant of the contact signal ($S_C$) equal to the second value (1) when the respective value of the feature signal ($S_T$) at said instant is smaller than, or equal to, the threshold variance ($V_s$); or setting the value at each instant of the contact signal ($S_C$) equal to the first value (0) when the respective value of the feature signal ($S_T$) at said instant is greater than the threshold variance ($V_s$).

The differential signal ($S_D$) may be equal to, or proportional to, the difference between the first ($S_{Q1}$) and the second ($S_{Q2}$) charge variation signals.

A computer program product loadable into a control unit (23) of a foldable electronic device (10), said computer program being designed such that, when executed, the control unit (23) may become configured to implement a detection method (50) of a state of said foldable electronic device (10).

A control unit (23) may be for a foldable electronic device (10) including a first hardware element (12; 14) and a second hardware element (14; 12) tiltable to each other in a first state or in a second state of the foldable electronic device (10), wherein the first hardware element (12; 14) accommodates a first electrode (20b; 22b) and the second hardware element (14; 12) accommodates a second electrode (22b; 20b), the first and second electrodes (20b, 22b) being in contact with each other when the foldable electronic device (10) is in the first state, being at a distance from each other when the foldable electronic device (10) is in the second state and being configured to detect respective environmental electric and/or electrostatic charge variations, the control unit (23) being coupable to the first and second electrodes (20b, 22b) and being configured to acquire (S10) a first charge variation signal ($S_{Q1}$) through the first electrode (20b; 22b) and a second charge variation signal ($S_{Q2}$) through the second electrode (22b; 20b), the first ($S_{Q1}$) and the second ($S_{Q2}$) charge variation signals being indicative of said respective environmental electric and/or electrostatic charge variations; generate (S12) a differential signal ($S_D$) indicative of a difference between the first ($S_{Q1}$) and the second ($S_{Q2}$) charge variation signals; generate (S14, S16, S18, S20), as a function of the differential signal ($S_D$), one or more feature signals ($S_T$) indicative of respective features of the differential signal ($S_D$); and generate (S22), as a function of the one or more feature signals ($S_T$), a contact signal ($S_C$) which assumes a value equal to a first value (0) or to a second value (1), the first value (0) of the contact signal ($S_C$) being indicative of the absence of contact between the first and second electrodes (20b, 22b) and therefore of the second state of the foldable electronic device (10), and the second value (1) of the contact signal ($S_C$) being indicative of the contact between the first and second electrodes (20b, 22b) and therefore of the first state of the foldable electronic device (10).

A foldable electronic device (10) may be summarized as including a first hardware element (12; 14) and a second hardware element (14; 12) tiltable to each other in a first state or in a second state, wherein the first hardware element (12; 14) accommodates a first electrode (20b; 22b) and the second hardware element (14; 12) accommodates a second electrode (22b; 20b), the first and second electrodes (20b, 22b) being in contact with each other when the foldable electronic device (10) is in the first state, being at a distance from each other when the foldable electronic device (10) is in the second state and being configured to detect respective environmental electric and/or electrostatic charge variations, the foldable electronic device (10) further including a control unit (23) coupled to the first and second electrodes (20b, 22b) and configured to acquire (S10) a first charge variation signal ($S_{Q1}$) through the first electrode (20b; 22b) and a second charge variation signal ($S_{Q2}$) through the second electrode (22b; 20b), the first ($S_{Q1}$) and the second ($S_{Q2}$) charge variation signals being indicative of said respective environmental electric and/or electrostatic charge variations; generate (S12) a differential signal ($S_D$) indicative of a difference between the first ($S_{Q1}$) and the second ($S_{Q2}$) charge variation signals; generate (S14, S16, S18, S20), as a function of the differential signal ($S_D$), one or more feature signals ($S_T$) indicative of respective features of the differential signal ($S_D$); and generate (S22), as a function of the one or more feature signals ($S_T$), a contact signal ($S_C$) which assumes a value equal to a first value (0) or to a second value (1), the first value (0) of the contact signal ($S_C$) being indicative of the absence of contact between the first and second electrodes (20b, 22b) and therefore of the second state of the foldable electronic device (10), and the second value (1) of the contact signal ($S_C$) being indicative of the contact between the first and second electrodes (20b, 22b) and therefore of the first state of the foldable electronic device (10).

The first and second electrodes (20b, 22b) may be included in an electric and/or electrostatic charge variation sensor coupled to the control unit (23), or the first and second electrodes (20b, 22b) may be included in a first (20; 22) and, respectively, a second (22; 20) electric and/or electrostatic charge variation sensor coupled to the control unit (23).

The first hardware element (12; 14) may have a first surface (12a; 14a) and the second hardware element (14; 12) may have a respective first surface (14a; 12a) which faces the first surface (12a; 14a) of the first hardware element (12; 14) when the foldable electronic device (10) is in the first state, wherein the first surfaces (12a, 14a) of the first hardware element (12; 14) and of the second hardware element (14; 12) form a lid angle ($\alpha_{LID}$) between each other which may be equal to 0°±5° when the foldable electronic device (10) is in the first state and may be different from 0°±5° when the foldable electronic device (10) is in the second state.

The first hardware element (12; 14) may further accommodate a third electrode and the second hardware element (14; 12) may further accommodate a fourth electrode, the third and fourth electrodes being in contact with each other when the lid angle ($\alpha_{LID}$) is equal to 360°±5°, being at a distance from each other when the lid angle ($\alpha_{LID}$) is different from 360°±5° and being configured to detect respective environmental electric and/or electrostatic charge variations, and the control unit (23) may be further coupled to the third and fourth electrodes and may be also configured to acquire (S10) a third charge variation signal through the third electrode and a fourth charge variation signal through the fourth electrode, the third and fourth charge variation signals being indicative of said respective environmental electric and/or electrostatic charge variations detected by the third and, respectively, by the fourth electrodes; generate (S12) a further differential signal indicative of a difference between the third and fourth charge variation signals; generate (S14, S16, S18, S20), as a function of the further differential signal, one or more further feature signals indicative of respective features of the further differential signal; and generate (S22), as a function of the one or more further feature signals, a further contact signal which assumes a value equal to the first value or the second value, the first value of the further contact signal being indicative of the absence of contact between the third and fourth electrodes and therefore of the lid angle ($\alpha_{LID}$) of the foldable electronic device (10) different from 360°±5°, and the second value of the further contact signal being indicative of the contact between the third and fourth electrodes and therefore of the lid angle ($\alpha_{LID}$) of the foldable electronic device (10) equal to 360°±5°.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A detection method, comprising:
    acquiring, by control circuitry of a foldable electronic device, a first charge variation signal through a first electrode and a second charge variation signal through a second electrode,
        the first and second charge variation signals being indicative of respective environmental electrostatic charge variations,
        the foldable electronic device including a first hardware element and a second hardware element configured to move in to a first state and a second state,
        the first hardware element and the second hardware element including the first electrode and the second electrode, respectively,
        the first and second electrodes being in contact with each other when the foldable electronic device is in the first state, and being at a distance from each other when the foldable electronic device is in the second state;
    generating, by the control circuitry, a differential signal indicative of a difference between the first and second charge variation signals;
    generating, by the control circuitry and as a function of the differential signal, one or more feature signals indicative of respective features of the differential signal,
        the generating of the one or more feature signals including calculating, for the differential signal, at least one of a peak-to-peak amplitude, a variance, a standard deviation, an energy, or a number of peaks with amplitude greater than a threshold amplitude; and
    generating, by the control circuitry and as a function of the one or more feature signals, a contact signal which is equal to a value selected from a first value and a second value,
        the first value being indicative of the second state of the foldable electronic device,
        the second value being indicative of the first state of the foldable electronic device.

2. The detection method according to claim 1, comprising:
    controlling, by the control circuitry, one or more functionalities of the foldable electronic device as a function of the contact signal.

3. The detection method according to claim 1, wherein the generating of the one or more feature signals includes downsampling the differential signal at a lower sampling frequency than an acquisition frequency of the differential signal.

4. The detection method according to claim 1, wherein the generating of the one or more feature signals includes filtering the differential signal with a high-pass filter having a cut-off frequency greater than a threshold cut-off frequency, or with a band-pass filter with a lower cut-off frequency greater than the threshold cut-off frequency.

5. The detection method according to claim 1, wherein the generating of the one or more feature signals includes:
    storing, in a buffer, a time window of the differential signal, having a duration equal to a buffering period; and
    calculating the one or more features of the differential signal based on the time window.

6. The detection method according to claim 5, wherein the generating of the one or more feature signals includes:
    repeating the storing of the time window and the calculating of the one or more features of the differential signal a plurality of times for a plurality of time windows, respectively, of the differential signal; and
    forming each of the one or more feature signals by concatenating calculated values of the respective feature to each other.

7. The detection method according to claim 1, wherein the generating of the contact signal includes processing the one or more feature signals using machine learning techniques.

8. The detection method according to claim 1, wherein the generating of the contact signal includes comparing the one or more feature signals to one or more feature threshold values, respectively, and determining the contact signal as a function of the comparing of the one or more feature signals to the one or more feature threshold values.

9. The detection method according to claim 8,
    wherein the generating of the one or more feature signals includes calculating a variance of the differential signal, wherein the comparing of the one or more feature signals to the one or more respective feature threshold values includes comparing each value of the feature signal indicative of the variance with a threshold variance, and wherein the determining of the contact signal as a function of the comparing of the one or more feature signals to the one or more feature threshold values includes:
setting the value of the contact signal equal to the second value in response to the feature signal being smaller than, or equal to, the threshold variance; and
setting the value of the contact signal equal to the first value in response to the feature signal being greater than the threshold variance.

10. The detection method according to claim 1, wherein the differential signal is equal to, or proportional to, the difference between the first and the second charge variation signals.

11. A non-transitory computer-readable medium having contents which configure control circuitry of a foldable electronic device to perform a detection method, the detection method comprising:
acquiring a first charge variation signal through a first electrode and a second charge variation signal through a second electrode,
the first and second charge variation signals being indicative of respective environmental electrostatic charge variations,
the foldable electronic device including a first hardware element and a second hardware element configured to move in to a first state and a second state,
the first hardware element and the second hardware element including the first electrode and the second electrode, respectively,
the first and second electrodes being in contact with each other when the foldable electronic device is in the first state, and being at a distance from each other when the foldable electronic device is in the second state;
generating a differential signal indicative of a difference between the first and second charge variation signals;
generating, as a function of the differential signal, one or more feature signals indicative of respective features of the differential signal,
the generating of the one or more feature signals including calculating, for the differential signal, at least one of a peak-to-peak amplitude, a variance, a standard deviation, an energy, or a number of peaks with amplitude greater than a threshold amplitude; and
generating, as a function of the one or more feature signals, a contact signal which is equal to a value selected from a first value and a second value,
the first value being indicative of the second state of the foldable electronic device,
the second value being indicative of the first state of the foldable electronic device.

12. The non-transitory computer-readable medium according to claim 11, wherein the contents include instructions executed by the control circuitry.

13. A device for a foldable electronic device, the device comprising:
a memory; and
processing circuitry coupled to the memory, wherein the processing circuitry, in operation:
acquires a first charge variation signal through a first electrode and a second charge variation signal through a second electrode,
the first and second charge variation signals being indicative of respective environmental electrostatic charge variations,
the foldable electronic device including a first hardware element and a second hardware element configured to move in to a first state and a second state,
the first hardware element and the second hardware element including the first electrode and the second electrode, respectively,
the first and second electrodes being in contact with each other when the foldable electronic device is in the first state, and being at a distance from each other when the foldable electronic device is in the second state;
generates a differential signal indicative of a difference between the first and second charge variation signals;
generates, as a function of the differential signal, one or more feature signals indicative of respective features of the differential signal,
the generation of the one or more feature signals including calculation, for the differential signal, of at least one of a peak-to-peak amplitude, a variance, a standard deviation, an energy, or a number of peaks with amplitude greater than a threshold amplitude; and
generates, as a function of the one or more feature signals, a contact signal which is equal to a value selected from a first value and a second value,
the first value being indicative of the second state of the foldable electronic device,
the second value being indicative of the first state of the foldable electronic device.

14. The device according to claim 13, wherein the processing circuitry, in operation, controls one or more functionalities of the foldable electronic device as a function of the contact signal.

15. A foldable electronic device comprising:
a first hardware element and a second hardware element configured to move in to a first state and a second state,
the first hardware element including a first electrostatic charge variation sensor having a first electrode, and the second hardware element including a second electrostatic charge variation sensor having a second electrode,
the first electrostatic charge variation sensor configured to measure a change in electrostatic charge detected by the first electrode and induced by a surrounding environment, and generate a first electrostatic charge variation signal indicating the change in electrostatic charge detected by the first electrode,
the second electrostatic charge variation sensor configured to measure a change in electrostatic charge detected by the second electrode and induced by the surrounding environment, and generate a second electrostatic charge variation signal indicating the change in electrostatic charge detected by the second electrode,
the first and second electrodes being in contact with each other when the foldable electronic device is in the first state, being at a distance from each other when the foldable electronic device is in the second state; and control circuitry, which, in operation:
acquires the first electrostatic charge variation signal and the second electrostatic charge variation signal;
generates a differential signal indicative of a difference between the first and second electrostatic charge variation signals;
generates, as a function of the differential signal, one or more feature signals indicative of respective features of the differential signal; and
generates, as a function of the one or more feature signals, a contact signal which is equal to a value selected from a first value and a second value, the first value being indicative of the second state of the foldable electronic device, the second value being indicative of the first state of the foldable electronic device.

16. The foldable electronic device according to claim 15, wherein
the first hardware element has a first surface, and the second hardware element has a second surface that faces the first surface of the first hardware element when the foldable electronic device is in the first state,
the first and second surfaces form a lid angle between each other,
the lid angle is a first angle between −5° and 5° when the foldable electronic device is in the first state, and
the lid angle is a second angle different from the first angle when the foldable electronic device is in the second state.

17. The foldable electronic device according to claim 16, wherein
the first hardware element includes a third electrostatic charge variation sensor having a third electrode, and the second hardware element includes a fourth electrostatic charge variation sensor having a fourth electrode,
the third electrostatic charge variation sensor configured to measure a change in electrostatic charge detected by the third electrode and induced by the surrounding environment, and generate a third electrostatic charge variation signal indicating the change in electrostatic charge detected by the third electrode,
the fourth electrostatic charge variation sensor configured to measure a change in electrostatic charge detected by the fourth electrode and induced by the surrounding environment, and generate a fourth electrostatic charge variation signal indicating the change in electrostatic charge detected by the fourth electrode,
the third and fourth electrodes are in contact with each other when the lid angle is a third angle between 355° and 365°, are at a distance from each other when the lid angle is a fourth angle different from the third angle, and
the control circuitry, in operation:
acquires the third electrostatic charge variation signal and the fourth electrostatic charge variation signal;
generates a further differential signal indicative of a difference between the third and fourth electrostatic charge variation signals;
generates, as a function of the further differential signal, one or more further feature signals indicative of respective features of the further differential signal; and
generates, as a function of the one or more further feature signals, a further contact signal which is equal to a value selected from equal to the first value and the second value, the first value being indicative of the fourth angle, the second value being indicative of the third angle.

18. A detection method, comprising:
acquiring, by control circuitry of a foldable electronic device, a first charge variation signal through a first electrode and a second charge variation signal through a second electrode,
the first and second charge variation signals being indicative of respective environmental electrostatic charge variations,
the foldable electronic device including a first hardware element and a second hardware element configured to move in to a first state and a second state,
the first hardware element and the second hardware element including the first electrode and the second electrode, respectively,
the first and second electrodes being in contact with each other when the foldable electronic device is in the first state, and being at a distance from each other when the foldable electronic device is in the second state;
generating, by the control circuitry, a differential signal indicative of a difference between the first and second charge variation signals;
generating, by the control circuitry and as a function of the differential signal, one or more feature signals indicative of respective features of the differential signal,
the generating of the one or more feature signals including downsampling the differential signal at a lower sampling frequency than an acquisition frequency of the differential signal; and
generating, by the control circuitry and as a function of the one or more feature signals, a contact signal which is equal to a value selected from a first value and a second value,
the first value being indicative of the second state of the foldable electronic device,
the second value being indicative of the first state of the foldable electronic device.

19. The detection method according to claim 18, wherein the generating of the contact signal includes comparing the one or more feature signals to one or more feature threshold values, respectively, and determining the contact signal as a function of the comparing of the one or more feature signals to the one or more feature threshold values.

20. A detection method, comprising:
acquiring, by control circuitry of a foldable electronic device, a first charge variation signal through a first electrode and a second charge variation signal through a second electrode,
the first and second charge variation signals being indicative of respective environmental electrostatic charge variations,
the foldable electronic device including a first hardware element and a second hardware element configured to move in to a first state and a second state,
the first hardware element and the second hardware element including the first electrode and the second electrode, respectively,
the first and second electrodes being in contact with each other when the foldable electronic device is in the first state, and being at a distance from each other when the foldable electronic device is in the second state;

generating, by the control circuitry, a differential signal indicative of a difference between the first and second charge variation signals;

generating, by the control circuitry and as a function of the differential signal, one or more feature signals indicative of respective features of the differential signal, the generating of the one or more feature signals including filtering the differential signal with a high-pass filter having a cut-off frequency greater than a threshold cut-off frequency, or with a band-pass filter with a lower cut-off frequency greater than the threshold cut-off frequency; and generating, by the control circuitry and as a function of the one or more feature signals, a contact signal which is equal to a value selected from a first value and a second value, the first value being indicative of the second state of the foldable electronic device, the second value being indicative of the first state of the foldable electronic device.

21. The detection method according to claim 20, wherein the generating of the contact signal includes comparing the one or more feature signals to one or more feature threshold values, respectively, and determining the contact signal as a function of the comparing of the one or more feature signals to the one or more feature threshold values.

\* \* \* \* \*